United States Patent Office 2,853,252
Patented Sept. 23, 1958

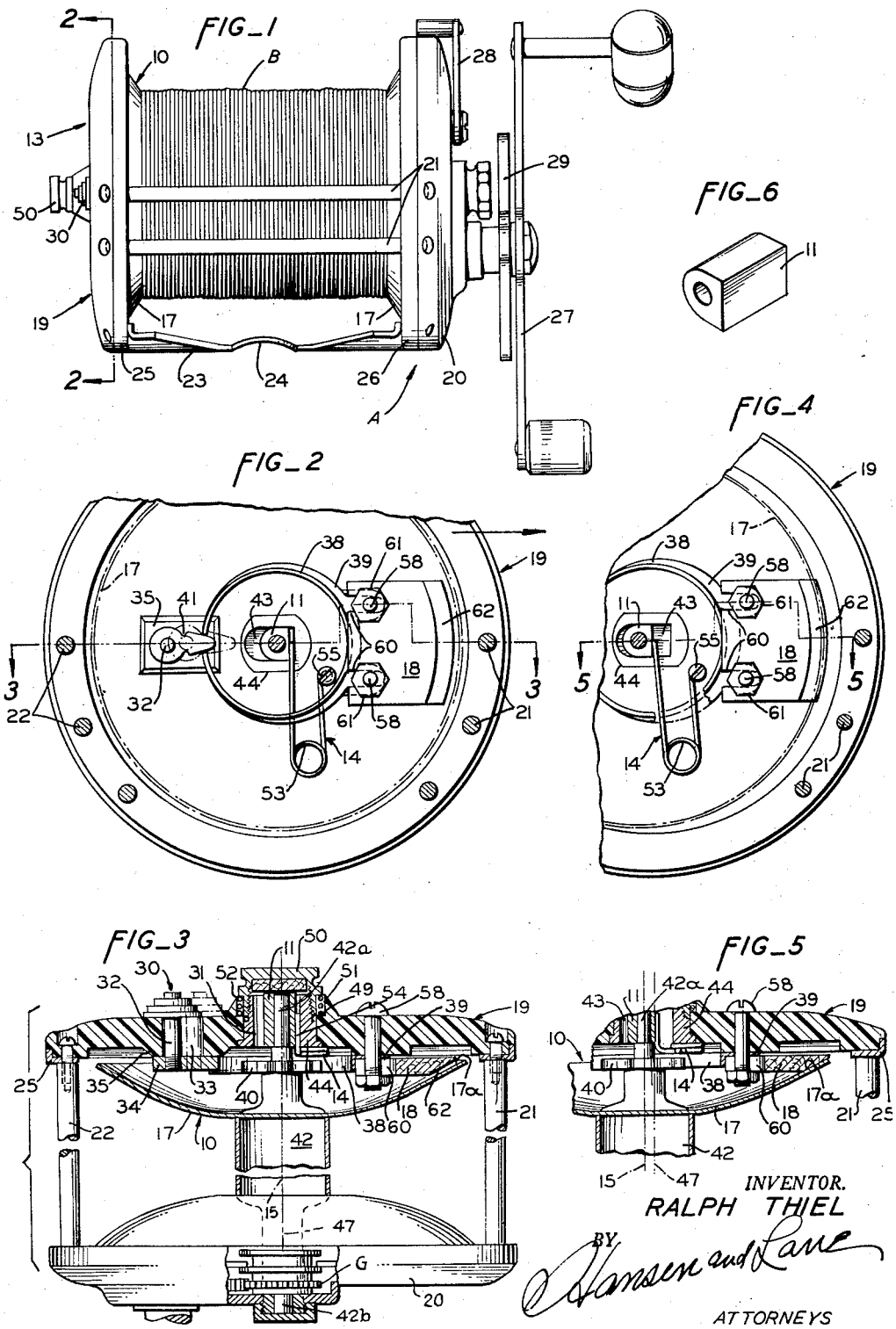

2,853,252

ANTI-BACKLASH MECHANISM FOR FISHING REELS

Ralph Thiel, Seaside, Calif.

Application June 17, 1955, Serial No. 516,145

5 Claims. (Cl. 242—84.52)

The present invention relates to reels, and pertains more particularly to an anti-backlash mechanism for fishing reels.

In bait and surf casting with a rotary spool type of fishing reel it is common practice to control the rotative speed of the spool during a cast by means of thumb pressure on the line wound on the spool. This is called "thumbing" the reel and is necessary in order to prevent the momentum of the spinning spool from over-running the line as the bait or weight on the end of the line loses momentum during the cast. Such over-running of the spool causes the line to tangle, and results in what is commonly referred to as a "backlash."

In the past, various attempts have been made to prevent such over-running of the line by the spool by means of various types of more or less automatic braking mechanisms. Such mechanisms are intended to reduce the speed of the spool as tension on the line is reduced. Many of these devices, generally referred to as "anti-backlash" mechanisms, are operated by direct contact with the line itself, and therefore introduce an element of friction on the line which prevents the making of as long a cast as when no such anti-backlash mechanism is provided and the reel is expertly thumbed.

I have now devised an anti-backlash reel mechanism wherein the rotative speed of the spool is positively and delicately controlled during a cast so as not to overrun the line, and one which exerts a negligable amount of interference with the out-running of the line.

The invention contemplates mounting the reel spool on a slightly tiltable axis, whereby the spool is axially centered for rotation in a free running condition when the bait or weight on the end of the line is going out at a speed to prevent over-running of the line by the spool, but which is moved to a slightly tilted condition to cause one end of the spool to engage a brake member when the line is in a condition of incipient slackness which otherwise would induce over-running of the line by the spool, causing a backlash.

A further object of the invention is to make an improved and simplified anti-backlash mechanism for fishing reels.

These and other objects and advantages of the invention will be apparent from the following description and the accompanying drawing, consisting of one sheet, wherein:

Fig. 1 is a side elevational view of a fishing reel embodying the present invention.

Fig. 2 is an enlarged, fragmentary, sectional view taken along line 2—2 of Fig. 1, the upper portion thereof being broken away, the position of the reel drum head being indicated in broken lines, the parts being shown with the reel spool in its free-running condition during a cast.

Fig. 3 is a fragmentary sectional view of the reel taken as along line 3—3 of Fig. 2, central portions thereof being broken away.

Fig. 4 is a view generally similar to Fig. 2, the parts being shown with the reel spool braked to prevent over-running of the line, other portions of the reel being broken away.

Fig. 5 is a fragmentary sectional view of the reel taken as along line 5—5 of Fig. 4.

Fig. 6 is an enlarged perspective view of the floating, spring-biased spool bearing.

Briefly, the present invention comprises journaling an end of the line-winding spool 10 of a conventional casting or trolling reel A in a floating bearing block 11 mounted for limited movement in a direction generally parallel to that in which the line B leaves the reel during a cast.

Tension on the line B when it is being either cast out or retrieved moves the spool bearing 11 to axially centered condition in the reel frame 13 with the spool in free-running condition as shown in Figs. 2 and 3. When the line slackens, however, and tension thereon is thus relieved, a light-weight spring 14 urges the bearing block 11 to the axially tilted position of Figs. 4 and 5, whereby the spool axis 15 (broken lines Figs. 3 and 5) is tilted from a position coaxially of the reel frame 13 (Fig. 3) to the angularly offset position indicated in Fig. 5.

In the latter tilted condition of the reel spool 10, the inner face 17a of the domed spool head 17 is moved into frictional engagement with a brake block 18 adjustably mounted on the inner side of the reel frame end plate 19. The braking of the spool thus effected prevents the spool from over-running the line and causing a backlash during a cast. Resumption of tension on the line as the spool is slowed by braking again draws the spool to co-axial position in the frame and frees the spool head from engagement with the brake block.

Referring to the drawings in detail, the invention is illustrated as embodied in the conventional, free-spooling, star-drag salt water fishing reel A, wherein the line winding spool 10 is journaled to rotate in the frame 13.

The frame 13 comprises a pair of stationary end plates 19 and 20, which may be of hard, molded plastic material, secured together by fixed frame struts 21 and 22, one pair of which is provided on each side of the reel frame. A bottom frame plate 23 extends between the reel end plates 19 and 20, and has a usual saddle mount portion 24 formed centrally thereof for fitted insertion in the reel seat (not shown) of a conventional fishing rod, not shown. Usual metal reinforcing rings 25 and 26 (Figs. 1, 3 and 5) may be provided marginally around each of the end plates 19 and 20, respectively.

A usual winding handle 27 is in conventional, releasable, geared, driving relation with the spool 10, a free-spooling release lever 28 being mounted in a usual manner selectively to engage or release the driving connection, shown at G in Fig. 3, between the winding handle 27 and the spool 10.

A usual star-drag wheel 29 is mounted on the reel end plate 20 to control a brake, not shown, which acts on the spool 10. This general type of reel is conventional, and since the construction and operation of the parts mentioned in this and the foregoing two paragraphs are well known, and since they form no part of the present invention, they will not be described in further detail herein.

An additional conventional feature of the illustrated reel A is the click device 30, which comprises an actuating button 31 exposed on the outerside of the reel end plate 19, and mounted on the outer end of a pin 32 which rides in a radially elongated slotted hole 33 in the end plate 19.

A click prong 34 is mounted on the inner end of the pin 32 to slide on an abutment 35 formed integrally on the inner side of the end plate 19. The rounded, pointed inner end of the click prong 34 is resiliently gripped between the ends of a split spring ring 38. An integrally formed flange 39 on the split ring 38 is gripped between the brake block 18 and the reel end plate 19 to secure the ring to the end plate.

As is customary with such click devices, when the click prong 34 is in its outward, solid line position shown in Figs. 2 and 3, the prong 34 rides free, radially beyond the teeth of a pinion 40 secured coaxial to the spool 10 to rotate therewith. When the click button 31 is pushed radially inwardly, however, to its broken line position of Figs. 2 and 3, the ends of the split ring 38 enter notches 41 in the sides of the prong 34, resiliently holding the prong against outward displacement. When so held, the prong rides on the teeth of the pinion 40, causing a clicking sound upon rotation of the spool 10, and at the same time resisting rotation of the spool.

Although the invention is shown as incorporated in a free-spooling, star-drag type of reel, it will be understood that it may be provided in any rotary-spool casting reel of either fresh or salt water types.

The reel spool 10 comprises a hub portion 42 upon which the line B is wound in a usual manner. Outwardly concave domed spool heads 17 are mounted coaxially one on each end of the hub portion 42, and a stub shaft 42a is mounted to extend coaxially beyond one domed head 17 for journal support in the floating bearing block 11.

The bearing block 11 is mounted for limited lateral slidable movement in a slotted hole 43 provided in a brass insert 44 molded into the reel end plate 19. The slotted hole 43 is elongated in the direction in which the line B leaves the reel during a cast.

The other end of the spool 10 also is provided with a usual stub shaft in prolongation of the hub 42, as shown at 42b in Fig. 3, journaled in a conventional manner in the reel end plate 20 so as to permit, without binding, the slight tilting of the spool axis 15, relative to the frame axis 47 caused by movement of the bearing block 11 between its spool releasing position of Figs. 2 and 3, and its spool braking position of Figs. 4 and 5.

The brass insert 44 (Figs. 2 to 5, inclusive) is provided with an externally threaded extension 49 (Fig. 3) on its axially outer end, onto which a sealing cap 50 is threadedly mounted. An annular recess 51, formed in the reel end plate 19 around the threaded extension 49, receives a coil spring 52, which is held in compression between the sealing cap 50 and the bottom of the recess 51. The spring 52 frictionally retains the sealing cap 50 in rotatively adjusted position.

The light bow spring 14 is mounted to bias the bearing block 11 in a direction opposite to the direction of line runout during a cast. It may have one or more coils 53 formed therein, as required. An outwardly bent end portion 54 (Figs. 3 and 5) is formed on one end of the spring 14 to enter the slotted hole 43 and bear against the side of the movable bearing block 11 toward which the line runs from the spool in making a cast.

The other end of the bow spring 14 is secured by a screw 55 to the reel end plate 19. The biasing stress of the spring 14 on the bearing 11 may be controlled by the weight and stiffness of the wire used in making the spring, the number of coils 53 (if any) formed therein, and by deforming the wire of the spring itself, all in a manner well known to those familiar with the art of spring making.

The brake block 18 may be of any suitable material such as the asbestos-cement blocks used for lining automobile brakes. The block 18 is adjustably secured to the reel end plate 19 by a pair of small bolts 58, which are inserted through holes provided therefor in the end plate, through corresponding holes provided therefor in the ring flange 39, and through slots 60 provided therefor in the brake block 18. By loosening the nut 61 of these bolts 58, the brake block 18 may be adjusted radially outwardly or inwardly as required, and may be secured in adjusted position by again tightening the nuts 61 on the bolts.

The radially outward face 62 of the brake block 18 is curved and beveled as indicated in Figs. 2 to 5 inclusive to conform to the inner face of the spool head 17 when the latter is urged into the braking position of Fig. 5 by the bow spring 14.

The spring 14 is sufficiently light in its biasing effect on the bearing block 11 to be easily overcome by a slight tension on the line B when it is either running from the reel in the direction of the arrow in Fig. 2 during a cast, or is being retrieved. However, any slackening of the line will permit the spring 14 to move the bearing block 11 toward the position of Fig. 5, thereby moving the spool head 17 into frictional engagement with the brake block 18. By properly locating the brake block 18, and adjusting the biasing stress of the spring 14 the reel may be balanced so that the frictional effect exerted on the drum during a cast will be negligible, but still will be adequate to prevent backlash.

The invention thus provides a simple and effective anti-backlash mechanism for all rotary spool type casting and fishing reels of the general type illustrated, and one having no external mechanism which might confuse the user or confuse one not familiar with their use.

While I have illustrated and described a preferred embodiment of the present invention, it will be understood however, that various changes and modifications may be made in the details thereof without departing from the scope of the invention as set forth in the appended claims.

Having thus described the invention, what I claim as new and desire to protect by Letters Patent is defined in the following claims.

I claim:

1. A fishing line reel comprising a frame having end plate members spaced apart along its longitudinal axis, a relatively fixed bearing in one of said plate members and a bearing slidably mounted in the other of said plate members for slight movement in substantially the direction in which the line moves to or from the reel, a spool having opposite head members each located adjacent one of said plate members and connected by a line-carrying axial hub having terminal journals, one mounted in said slidable bearing and the other relatively loosely mounted in said fixed bearing for tilting movement of said spool responsive to sliding movement of said movable bearing between a position in which the spool is substantially coaxial with the frame and a position tilted therefrom, a brake positioned on one of said members at the end of the reel adjacent said movable bearing adapted to make braking engagement with a portion of the adjacent member spaced radially outwardly from the adjacent journal in response to movement of the spool to one of said positions, and light spring means biasing the spool to said position and adapted to be overcome so as to free the spool for movement to said other position, with said brake disengaged from the cooperating member, in response to tension of the line during take-off.

2. A fishing line reel as claimed in claim 1 in which the brake is positioned on the frame plate member at the end of the reel adjacent the movable bearing and is engageable with the peripheral marginal portion of the adjacent spool head member.

3. A fishing line reel as claimed in claim 1 in which the brake is disengaged from the cooperating member when the spool is in a position substantially coaxial with the frame.

4. A fishing line reel as claimed in claim 1 in which the brake is positioned on the frame plate member at the end of the reel adjacent the movable bearing and is engageable with the peripheral marginal portion of the adjacent spool head member when the spool is in a position tilted from coaxial relation with the frame.

5. The combination claimed in claim 1 including line-winding handle and gear means mounted on the frame end plate member adjacent said relatively fixed bearing and operatively connected to the adjacent end of the spool.

References Cited in the file of this patent

UNITED STATES PATENTS

| 1,434,626 | Parks | Nov. 7, 1922 |
| 1,864,900 | Gaddini | June 28, 1932 |